(12) United States Patent
Steffen et al.

(10) Patent No.: US 12,049,064 B2
(45) Date of Patent: Jul. 30, 2024

(54) LAMINATE COMPOSITE

(71) Applicant: RKW SE, Mannheim (DE)

(72) Inventors: Thomas Steffen, Kalefeld (DE); Lars Becker, Hahausen (DE); Karl-Heinz Bartnig, Warstein (DE); Sascha Hirsch, Paderborn (DE)

(73) Assignee: RKW SE, Mannheim (DE)

( * ) Notice: Subject to any disclaimer, the term of this patent is extended or adjusted under 35 U.S.C. 154(b) by 162 days.

(21) Appl. No.: 17/771,628

(22) PCT Filed: Aug. 27, 2020

(86) PCT No.: PCT/EP2020/073926
§ 371 (c)(1),
(2) Date: Apr. 25, 2022

(87) PCT Pub. No.: WO2021/094008
PCT Pub. Date: May 20, 2021

(65) Prior Publication Data
US 2022/0410544 A1 Dec. 29, 2022

(30) Foreign Application Priority Data
Nov. 12, 2019 (DE) .......................... 102019130409.1

(51) Int. Cl.
*B32B 27/08* (2006.01)
*B32B 7/022* (2019.01)
(Continued)

(52) U.S. Cl.
CPC .............. *B32B 27/08* (2013.01); *B32B 7/022* (2019.01); *B32B 27/26* (2013.01); *B32B 27/32* (2013.01); *B32B 2250/03* (2013.01); *B32B 2250/04* (2013.01); *B32B 2250/242* (2013.01); *B32B 2255/10* (2013.01); *B32B 2307/51* (2013.01);
(Continued)

(58) Field of Classification Search
CPC ............ B32B 2250/03; B32B 2250/04; B32B 2250/24; B32B 2250/242; B32B 2255/10; B32B 2307/50; B32B 2307/51; B32B 2307/71; B32B 2307/72; B32B 2307/732; B32B 2439/40; B32B 2553/00; B32B 27/08; B32B 27/18; B32B 27/26; B32B 27/32; B32B 7/02; B32B 7/022; A63F 13/2145; A63F 13/25; A63F 13/32; A63F 13/33; A63F 13/335; A63F 13/35; A63F 13/798; A63F 13/803; A63F 13/92; A63F 2300/1075; A63F 2300/407; A63F 2300/8017; G06Q 10/0639; G07F 17/323; G07F 17/3237; G07F 17/3272
See application file for complete search history.

(56) References Cited

FOREIGN PATENT DOCUMENTS

| EP | 0444261 | 9/1991 |
|---|---|---|
| EP | 1543955 | 6/2005 |

(Continued)

*Primary Examiner* — Lawrence D Ferguson
(74) *Attorney, Agent, or Firm* — Volpe Koenig

(57) ABSTRACT

A laminate composite composed of at least two laminations (1, 7) and an imprint located between them (3). The lamination (7) includes at least two layers (4, 5, 6). One layer (5) includes a UV absorber to protect the imprint. This layer (5) is characterized by having a lower density than the other layers (4, 6). The other layers (4, 6) preferably have a density that is higher relative to the one layer (5) by a factor of 1.005, in particular by a factor of 1.01, preferably by a factor of 1.015.

16 Claims, 1 Drawing Sheet

(51) Int. Cl.
B32B 27/26 (2006.01)
B32B 27/32 (2006.01)

(52) U.S. Cl.
CPC ..... *B32B 2307/72* (2013.01); *B32B 2307/732* (2013.01); *B32B 2553/00* (2013.01)

(56) References Cited

FOREIGN PATENT DOCUMENTS

| | | |
|---|---|---|
| EP | 1607339 | 12/2005 |
| WO | 2009010079 | 1/2009 |
| WO | 2013150141 | 10/2013 |
| WO | 2016156923 | 10/2016 |
| WO | 2018006980 | 1/2018 |

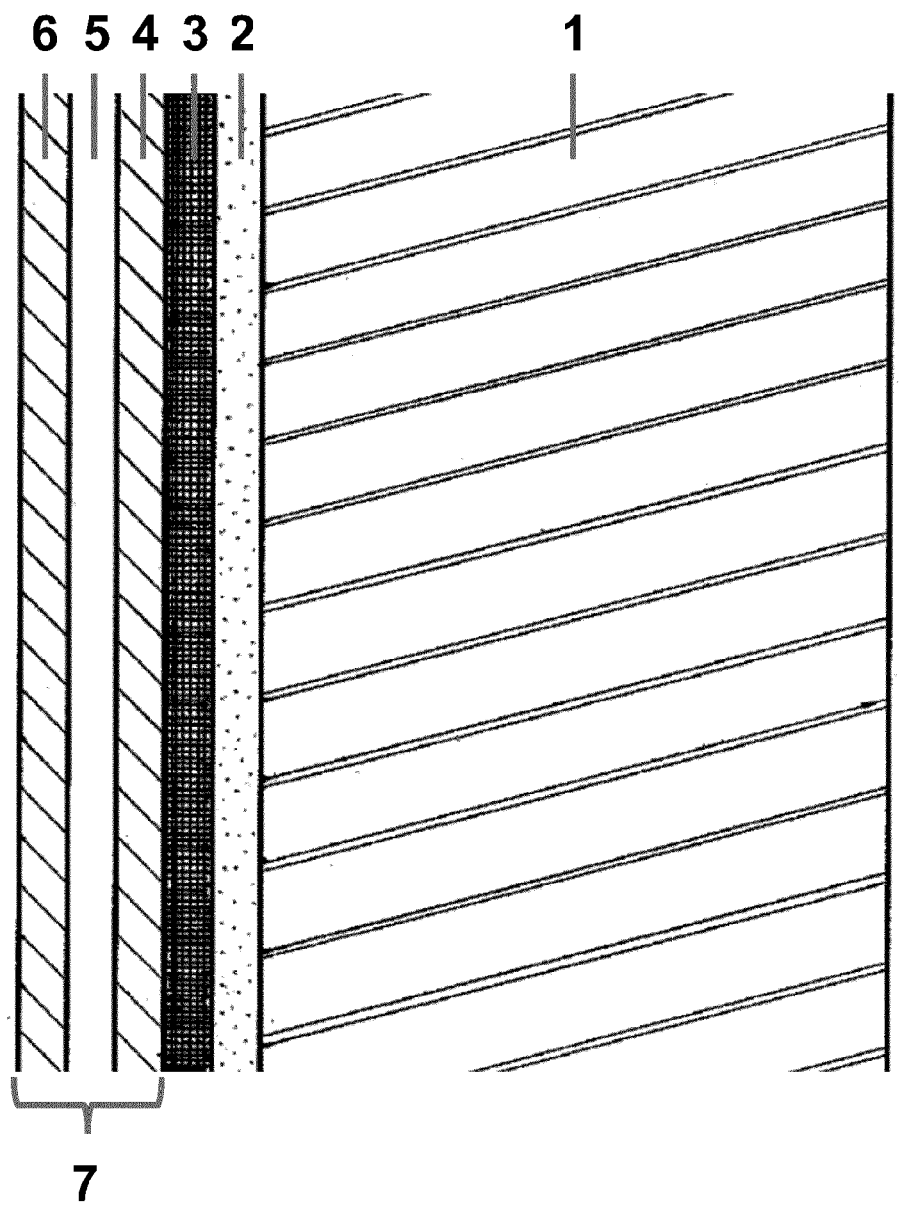

LAMINATE COMPOSITE

TECHNICAL FIELD

The invention relates to a laminate composite composed of at least two laminations, wherein an imprint is arranged between the laminations.

BACKGROUND

The term lamination describes a production technique in which a plurality of laminations are joined by means of a laminating agent. Depending on the laminating agent used, a distinction is made among the types wet, dry, and thermal lamination.

in cases where products are to be protected against wear or printed materials are to be protected against weathering, abrasion, soiling, moisture or chemicals, film lamination is often used. The product is sealed by means of a planar coating with a usually transparent plastic film and is thus imparted increased flexural and tear resistance. Depending on the film selected, both the haptics and the appearance of the product can thus be tailored to the wishes of the customer.

For example, WO 2013/150141 A1 describes a laminated film composite having at least two plastic films that is composed of a carrier film and a functional film and exhibits high abrasion and scratch resistance. In order to protect floors or furniture, this laminated film composite is laminated onto carrier materials in the interior and/or exterior industry. The carrier film is a pigmented polyolefin film, while the functional film is formed from polyurethane.

Plastic packagings are characterized by being light, stable, relatively impermeable, in particular water- and airtight, and inexpensive. Depending on the area of application, there is a specific requirement profile, so the components and structure of the films must be continuously optimized. The packaging of bulk materials poses a particular challenge. Plastic granules, chemicals, wood pellets, or foods such as bread crumbs can be mentioned as typical application examples.

Above all, the packaging of bulk materials in the construction material industry must meet special requirements. The variety of filling materials in this area ranges from pure, finely powdered plaster with an extremely narrow particle size distribution to ready-to-use mixtures of cement, sand and gravel with a correspondingly broad particle size distribution. In general, the mixture in question consists of a granular solid and air. Depending on the composition thereof, the filling materials can be compressed to differing degrees. The mass of a mixture per unit volume is referred to as the bulk density of the material. As this parameter indicates how much air is contained in the volume in question, it is of decisive importance for the transport and storage of bulk materials.

When powdered materials are filled into bags, air gets into the system. On the one hand, this is residual air from the filling process, and on the other, air is already present in the filling material depending on the bulk density. When a bag is stored, the bulk material settles to the bottom of the bag, while an air cushion is created over the bulk material. This phenomenon leads to instability in palletizing of multiple bags. For this reason, the removal of all residual air from the bag is essential for the storage and transport of bag packagings.

For cost reasons, FFS (form, fill, seal) tubes are preferred in the packaging of bulk materials. In this case, the packaging container is produced from an endless film web, in most cases immediately before filling. The endless film web is either manufactured as a tube, or a tube is first formed from a flat film or sheet by being folded over and sealed or glued in the longitudinal direction. The tube is delivered to the filling unit, where a first sealed or glued transverse seam forms the bottom and, after filling in of the material, the container is closed at the top by a second sealed or glued seam extending in the transverse direction.

When construction materials, which are often hygroscopic, are packaged, protection of the contents from moisture is of particular importance. On the other hand, such products are still very often filled in paper containers, because cement and similar materials, while and after they are filled, have a particular tendency to develop an overpressure in the packaging, which can escape through paper but remains inside airtight plastic packagings after these are sealed.

In order to avoid these problems, it is a known practice to provide a valve in the bottom of so-called block bottom bags, with the overpressure being vented through the valve during filling. For cost reasons, however, block bottom bags, and particularly those with complicated valve designs, are not desirable for comparatively low-cost products such as construction materials.

EP 444261 describes flexible packaging containers in the form of a sack or bag in which venting occurs through perforations in an area of the container where the latter is configured with two layers. For this purpose, perforations are provided both in the interior wall and the exterior wall, wherein the perforations in the exterior wall should have a smaller cross-sectional area than those in the interior wall. Venting is then carried out by means of an overpressure developing between the interior and exterior walls, such that the overpressure is intended to permit a controlled escape. When filling materials are very fine, a filter is required between the interior and exterior walls in order to prevent the filling material from escaping. Moreover, these perforations, which are arranged immediately one above the other after the overpressure has been vented, form an opening for the entry of air, water and other contaminants.

There is therefore a continuing need for an inexpensive packaging container that at the same time can reliably protect such filling container materials against contamination and/or moisture in cases where overpressure must be vented during and/or after said filling in.

Until the early 2000s, the only possibility for venting was the use of paper bags having a thin liner of perforated polyethylene film. The paper layer gives the bag the necessary stability, while the film is intended to protect the filling material from moisture. For structural reasons, however, the water vapor barrier of such a paper bag is extremely small, which limits the shelf life of e.g. cement-containing construction materials to a maximum of six months. On expiration of the shelf life, the cement has already absorbed too much moisture from the air, becomes solid, and is no longer usable.

In EP 1607339 A1, an FFS bag is described in which a space is formed by means of welded or glued seams that has an inner and outer wall. Openings are provided in the inner wall that allow gas to escape from the inside of the container into the space between the inner and outer wall. The welded or glued seams are configured in places to allow the gas to escape.

Palletizing of bulk materials packed in bags was significantly improved with the introduction of plastic bags having overpressure vents.

Construction materials are usually stored not only in warehouses, but also outdoors. The use of plastic films basically makes outdoor storage of moisture-sensitive bulk materials possible. In contrast to conventional indoor storage, however, the bags are exposed to the weather. One result of this inexpensive storage is mechanical abrasion of the printing inks as well as bleaching thereof by UV radiation. As a rule, lighter inks are less stable than darker inks. When products usually used in Central Europe are also used in Southern Europe or Africa, one can assume that their useful life will be significantly shorter when exposed to the effects of weather. Clear legibility of processing instructions, and above all instructions for hazardous goods, must of course be ensured during outdoor storage.

With its complex, multicolor print images, each plastic bag also constitutes not only a packaging solution, but also an effective marketing tool for the manufacturer of the bulk materials. For example, the optical appearance of the packaging gives the customer his or her first impression of the product. When the printing inks are bleached, the manufacturer not only loses an important advertising means. In some cases, this could also give the customer the impression of poorer product quality.

Filling of cement products into bags can be carried out today with reduced, but not completely eliminated, production of dust. The dust is deposited on all surfaces, thus also contaminating the filled bags. Ordinarily, there is no problem with the abrasion resistance of the printing inks used. However, if they are contaminated by cement dust, their resistance declines significantly. This is ordinarily manifested as discoloration of conveyor belts and other parts of the bagging and palletizing equipment. In this case, damage to the print image is not ordinarily visible, as the ink layer is thick enough. Nevertheless, there are some sensitive customers who will find fault with the abrasion resistance and file a complaint.

Moreover, contact between the thin layer of moisture on the skin of the hands and the cement is already sufficient to cause noticeable discoloration of the skin after only brief contact with the bag. This rubbing off of the ink has been reduced to date by application of a special dual-component protective lacquer. Because the printing units are arranged in series without complete intermediate drying, the inks and lacquers are sometimes printed wet on wet. This can cause the inks underlying the lacquer to rise to the surface thereof. This area is then no longer optimally protected and can be rubbed off.

SUMMARY

The object of the invention is to provide a laminate composite that ensures in a lasting manner a largely unaltered, appealing print image. In this manner, imprints are to be protected and maintained long-term by the special structure of the laminate composite, even on direct exposure to solar radiation. It is also necessary for the laminate composite to be light, stable, relatively impermeable, and in particular water- and airtight. In order for this to be established as a sustainable possibility for packaging, an economical configuration of the manufacturing process is also indispensable.

This object is achieved by a laminate composite having one or more of the features described herein. Preferred variants are specified below and in the claims.

The invention is realized by the lamination of film layers having a print motif inside. The main components of the laminate composite according to the invention are polymer layers which in turn form laminations. The layers are preferably composed of polyolefins, in particular polyethylene.

Generally, a distinction is made in the laminate composite according to the invention between base lamination and imprint lamination. The base lamination serves as a carrier and provides a stabilizing function, i.e. functions necessary for packaging of the bulk material. The overlying imprint lamination has the sole function of protecting the imprint and is transparent. It serves as a UV barrier in order to intercept the majority of the harmful ultraviolet radiation before it strikes the print image and to prevent bleaching.

The composition of the polymer batches used, referred to as master batches, can vary accordingly. In order to stabilize the homogenization process of the master batches, stabilizers such as phenolic antioxidants and phosphites are necessary. In addition, further additive packets are ordinarily added that are intended to ensure certain properties of the film. For example, these include anti-slip, antistatic, color or lubricant additives.

The transparent imprint lamination protects the imprint and is composed of at least two polymer layers. One of these layers further comprises a UV absorber to protect the print. According to the invention, this layer has a lower density relative to at least one of the other layers. In order to prevent migration, the layer provided with a UV absorber is further limited to the outside by a higher-density layer. In addition, a further layer also enables migration protection toward the inside in the direction of the imprint, so the layer with the UV absorber is preferably embedded between layers of higher density. The density of the flanking layers relative to the middle layer, which is provided with the UV absorber, is higher by a factor of 1.005, in particular by a factor of 1.01, preferably by a factor of 1.015.

Careful selection of the respective density yields various advantages. For example, the use of high-density polyethylene, HDPE, with a density of 0.940 $g/cm^3$-0.970 $g/cm^3$, provides dull, opaque surfaces that also show increased stiffness. This would reduce the legibility of the imprint to be protected and also make the plastic bags, which among other properties should also exhibit outstanding flexibility, more difficult to handle in production and application. Of course, the function of the individual layers, for example as migration barriers for the necessary UV absorbers, must also be taken into account. Although HDPE would prevent migration, it would not be suitable for the intended application because of its stiffness. Accordingly, the special configuration of the imprint lamination with respect to its density is due to a compromise that meets all of the desired requirements. This results in an innovative lamination of medium-density polyethylene, MDPE, low-density polyethylene, LDPE, and MDPE. Accordingly, the middle layer of the imprint lamination is composed primarily of LDPE and/or LLDPE, wherein the content of LDPE is preferably more than 10 wt. %, in particular more than 20 wt. %, preferably more than 30 wt. % and/or the content of LLDPE is more than 10 wt. %, in particular more than 20 wt. %, preferably more than 30 wt. %. It has been found to be particularly favorable if the middle layer of the cover layer has a total content of a mixture of LLDPE and LLDPE that is more than 50 wt. %, in particular more than 60 wt. %, preferably more than 70 wt. %.

The flanking layers are composed primarily of MDPE and/or HDPE. It has been found to be particularly favorable if the content of MDPE is preferably more than 30 wt. %, in particular more than 40 wt. %, preferably more than 50 wt. %. In a particularly advantageous variant of the invention, MDPE is combined with LLDPE in these layers. A content of at least 10 wt. % of LLDPE, preferably at least 20 wt. % of LLDPE, in particular at least 30 wt. % of LLDPE has been found to be particularly favorable.

According to the invention, the imprint lamination has a thickness of less than 60 μm, preferably less than 50 μm, in particular less than 40 μm and/or more than 20 μm, preferably more than 25 μm. In addition, the layer provided with the UV absorber is characterized by having a greater thickness relative to the other layers. In this context, a thickness greater by more than a factor of 1.1, preferably more than 1.2, in particular 1.3 has been found to be appropriate.

In order to protect the imprint from weathering, in the laminate composite according to the invention, UV absorbers, in particular organic UV absorbers, preferably benzophenones and/or benzotriazoles, are introduced into the middle layer of the imprint lamination. This takes place during manufacturing of the master batches prior to the blown film extrusion. In addition to organic UV absorbers, it is possible to use further, in particular inorganic UV absorbers, preferably metal oxides such as e.g. zinc oxide.

The effectiveness of UV absorbers decreases with decreasing layer thickness. In films and other thin products, the concentration must therefore be increased, which can lead to compatibility problems with the polymer matrix. Surprisingly, it was found that in the structure according to the invention, the thickness of the films in combination with the additive content made possible in this manner ensured sufficient UV protection. In the laminate composite according to the invention, the content of the UV absorbers in the middle layer of the imprint lamination is at least 1 wt. %, in particular at least 1.5 wt. %, preferably at least 2 wt. %.

As a result of UV radiation, free radicals form in polymers that severely damage the polymer matrix over time and lead to embrittlement. In order to prevent damage to the polymer matrix, stabilizers are used in the laminate composite according to the invention that capture the free polymer radicals at an early stage. For this purpose, sterically hindered amines (hindered amine light stabilizers: HALS) are added to specific layers.

In addition to the imprint lamination and the imprint, the laminate composite according to the invention also comprises a base lamination that has a thickness of less than 200 μm, preferably less than 150 μm, in particular less than 100 μm and/or more than 40 μm, preferably more than 50 μm, in particular more than 60 μm.

This gives rise to a total thickness of the laminate composite of between a minimum of 60 μm and a maximum of 260 μm.

It has been found to be particularly favorable if the base lamination has a multilayer structure. In a particularly advantageous variant of the invention, these layers are primarily composed of LLDPE and/or HDPE. Preferably, a layer composed primarily of HDPE is embedded between two layers composed primarily of LLDPE.

The polymer layers in the laminate composite according to the invention are produced by extrusion, preferably blown film extrusion. During the process, molten plastic is delivered via a ring-shaped nozzle, giving rise to a molten tube several meters high that is air-cooled. The solidified tube is then folded by a pair of squeeze rollers and then rolled up. The tear propagation resistance of the blown film produced is comparable in both directions, longitudinally and transversely. If a single-layer film is produced, this is referred to as mono-blown film extrusion. In contrast, blown film coextrusion involves the manufacture of multilayer films. These provide the possibility of combining the positive properties of a plurality of plastics in one film. This film type is produced by coextrusion in which two or more materials are brought together before leaving the profile nozzle.

In the invention, an imprint is applied to the imprint lamination. Depending on the area of application, information on the packaged bulk material and/or advertising for the corresponding manufacturer is/are shown. In this context, the printing not only of lettering or numbers, but also of graphics is conceivable. The intention is to produce multi-color print images, wherein monochrome imprints are also not excluded. The coloring agents used for this purpose may consist of pigments and/or dyes. In addition to the reverse printing process, in which the mirror-inverted imprint is applied to the underside of the imprint lamination, direct printing of the base lamination is also possible.

All of the laminations in the laminate composite according to the invention are firmly joined to one another. Lamination of the base lamination and imprint lamination can be carried out by adhesive or hot lamination, as is the case for lamination of packaging films. In particular, suitable adhesives for lamination are adhesives that are preferably transparent or colorless. In order to rule out optically undesirable long-term effects, the adhesive used should be configured to be oxidation-resistant and/or color-fast, in particular UV-stabilized and/or yellowing-resistant. For example, the two laminations can be joined with a polyurethane-based adhesive to the laminate composite according to the invention.

BRIEF DESCRIPTION OF THE DRAWINGS

Further advantages and features of the invention can be found in the description of a working example with reference to a drawing and in the drawing itself.

FIG. 1 shows a section through a laminate composite according to the invention.

DETAILED DESCRIPTION

FIG. 1 shows a composite that comprises a base lamination 1 and a transparent imprint lamination 7 with an imprint 3 lying between them. The two laminations 1 and 7 are joined by means of a laminating agent 2.

The laminate composite is characterized by a novel imprint lamination 7. Its unique feature is its multilayer structure, which is characterized by polyethylene films of varying density. The laminate composite according to the invention thus provides a specific combination of features that are not known in laminated film compositions of the prior art. The specific combination of the layers makes it possible to equip a thin lamination 7 with an additive package that makes it possible, as a transparent imprint lamination, to provide weather resistance to an imprint 3 applied underneath it.

In the working example shown, a three-layer imprint lamination is used. Layer 5 is embedded between layers 4 and 6 and is composed primarily of LLDPE and/or LDPE with a density of 0.923 g/cm$^3$.

The following components are used in the production of layer 5: 45% LLDPE, 40% LDPE, 10% UV absorber batch (20% active ingredient content), 5% UV stabilizer batch.

In the laminate composite, external layers 4 and 6, which do not have additive UV absorbers and UV stabilizers, function as a migration barrier for the absorber molecules in the middle layer 5.

The following components are used in the production of layers 4 and 6: 59% MDPE, 40% LLDPE, 1% anti-block batch in layer 4, and 55% MDPE, 40% LLDPE, 4% UV stabilizer batch, 1% anti-block batch in layer 6.

In the laminate composite according to the invention, the transparent imprint lamination 7 exhibits a total thickness of 30 μm. The ratio of the layer thicknesses is 30% for layer 4, 40% for layer 5 and 30% for layer 6. The imprint lamination 7 is produced by means of blown film coextrusion.

The thickness of the base lamination 1 is 80 μm in order to ensure the necessary stability in combination with the necessary flexibility of the laminate composite according to the invention. The white base lamination 1 is shown schematically in FIG. 1 as a monofilm. However, it has been found to be particularly advantageous to select a multilayer base lamination in particular in the form of a coextrusion film.

In the working example shown, the base lamination 1 has a three-layer configuration. The following components are used: 94% met. LLDPE, 6% additives (processing aid, white batch, filling material) in layer 1.1, 80% HDPE 10% LLDPE, 10% white batch and filling material in layer 1.2 and 94% met. LLDPE, 6% additives (processing aid, white batch, filling material) in layer 1.3.

Pigments are used for printing of the print image via reverse printing.

A polyurethane-based adhesive is used in lamination of the two laminations 1 and 7.

In conclusion, the composition of a particularly advantageous working example is shown in the following table:

| | | |
|---|---|---|
| Imprint lamination | 6 | 55% MDPE |
| | | 40% LLDPE |
| | | 4% UV stabilizer batch |
| | | 1% anti-block batch |
| | 5 | 45% LLDPE |
| | | 40% LDPE |
| | | 10% UV absorber batch (20% active ingredient content) |
| | | 5% UV stabilizer batch |
| | 4 | 59% MDPE |
| | | 40% LLDPE |
| | | 1% anti-block batch |
| Base lamination | 1.3 | 94% met. LLDPE |
| | | 6% additives (processing aid, white batch, filling material) |
| | 1.2 | 80% HDPE |
| | | 10% LLDPE |
| | | 10% white batch and filling material |
| | 1.1 | 94% met. LLDPE |
| | | 6% additives (processing aid, white batch, filling material) |

The laminate composite according to the invention exhibits particularly favorable product properties for use as packaging of bulk materials and also meets for the first time the requirement for weather-resistant imprints.

The invention claimed is:

1. A laminate composite, comprising:
   first and second laminations,
   an imprint arranged between the first and second laminations,
   the second lamination comprises at least two layers,
   one of the layers comprises a UV absorber to protect the imprint,
   the one of the layers has a lower density relative to at least one of the other layers,
   and the other layers have a higher density relative to the one of the layers by a factor of at least 1.005.

2. The laminate composite as claimed in claim 1, wherein the layers are composed primarily of polyolefins.

3. The laminate composite as claimed in claim 1, wherein the one of the layers is composed primarily of at least one of an LDPE or an LLDPE.

4. The laminate composite as claimed in claim 2, wherein the other layers are composed primarily of at least one of an MDPE or an HDPE.

5. The laminate composite as claimed in claim 1, wherein the second lamination has a thickness of less than 60 μm.

6. The laminate composite as claimed in claim 1, wherein the one of the layers in the second lamination has a greater thickness relative to the other layers, and the thickness is greater by more than a factor of 1.1.

7. The laminate composite as claimed in claim 1, wherein the one of the layers comprises organic UV absorbers.

8. The laminate composite as claimed in claim 1, wherein the one of the layers comprises inorganic UV absorbers.

9. The laminate composite as claimed in claim 8, wherein a content of the UV absorber in the one of the layers is at least 1 wt. %.

10. The laminate composite as claimed in claim 1, wherein at least one of the layers in the second lamination contains UV stabilizers.

11. The laminate composite as claimed in claim 1, wherein the first lamination has a thickness of less than 200 μm.

12. The laminate composite as claimed in claim 1, wherein the one of the layers is embedded between two of the other layers which have a higher density.

13. A bag for bulk materials comprising the laminate composite as claimed in claim 1.

14. The laminate composite as claimed in claim 1, wherein the lamination has a thickness of more than 20 μm.

15. The laminate composite as claimed in claim 10, wherein the UV stabilizers are hindered amine light stabilizers (HALS).

16. The laminate composite as claimed in claim 11, wherein the first lamination has a thickness of more than 50 μm.

* * * * *